United States Patent
Jacobs

(10) Patent No.: US 10,857,846 B1
(45) Date of Patent: Dec. 8, 2020

(54) ADJUSTABLE HITCH ASSEMBLY

(71) Applicant: Donald W. Jacobs, Springfield, MO (US)

(72) Inventor: Donald W. Jacobs, Springfield, MO (US)

(*) Notice: Subject to any disclaimer, the term of this patent is extended or adjusted under 35 U.S.C. 154(b) by 251 days.

(21) Appl. No.: 15/950,586

(22) Filed: Apr. 11, 2018

Related U.S. Application Data

(60) Provisional application No. 62/484,117, filed on Apr. 11, 2017.

(51) Int. Cl.
*B60D 1/46* (2006.01)
*B60D 1/52* (2006.01)
*B60D 1/06* (2006.01)

(52) U.S. Cl.
CPC .............. *B60D 1/46* (2013.01); *B60D 1/065* (2013.01); *B60D 1/52* (2013.01)

(58) Field of Classification Search
CPC ............. B60D 1/46; B60D 1/065; B60D 1/52
See application file for complete search history.

(56) References Cited

U.S. PATENT DOCUMENTS

| | | | |
|---|---|---|---|
| 241,629 A | 5/1881 | Deschamps | B61G 5/08 |
| 2,847,232 A * | 8/1958 | Graham | B60D 1/46 |
| | | | 280/490.1 |
| 2,911,233 A | 11/1959 | Riddle | A41F 11/16 |
| 4,033,601 A * | 7/1977 | Lindahl | B60D 1/46 |
| | | | 280/490.1 |
| 4,433,854 A | 2/1984 | Smith | B60D 1/06 |
| 4,889,356 A | 12/1989 | Morris | B60D 1/06 |
| 5,085,452 A | 2/1992 | Janeiro | B60D 1/06 |
| 5,104,138 A | 4/1992 | Allen | B62D 53/06 |
| 5,322,313 A | 6/1994 | Schroeder | B60D 1/06 |
| 5,560,630 A | 10/1996 | Phares et al. | B60D 1/06 |
| 5,741,022 A | 4/1998 | Wass et al. | B60D 1/06 |
| 5,839,744 A | 11/1998 | Marks | B62D 53/00 |
| 5,860,669 A | 1/1999 | Wass et al. | B60D 1/06 |
| 5,873,594 A * | 2/1999 | McCoy | B60D 1/46 |
| | | | 280/483 |
| 5,908,201 A | 6/1999 | Van Vleet | B60D 1/07 |
| 6,241,271 B1 | 6/2001 | Belinky | B60D 1/06 |
| 6,315,316 B1 | 11/2001 | Wyant | B60D 1/06 |

(Continued)

OTHER PUBLICATIONS

Andersen Rapid Hitch accessed at:—https://andersenhitches.com/Catalog/rapid-hitch.aspx on Apr. 10, 2018.

*Primary Examiner* — Ruth Ilan
*Assistant Examiner* — Marlon A Arce
(74) *Attorney, Agent, or Firm* — Jonathan A. Ray

(57) ABSTRACT

An adjustable hitch assembly has a hitch bracket, a vertically-adjustable hitch-ball mounting block, one or more hitch balls, and assorted other hardware including a plurality of hitch pins. The hitch bracket has essentially an L-shape and has a drawbar portion having an inside sidewall, a post portion having an inside sidewall and a wedge-shaped, gusset-form enlargement having an inside sidewall which transitions into the inside sidewalls respectively of the post portion and drawbar portion, filling in the inside angle between the drawbar portion and post portion. Wherein the vertically-adjustable hitch-ball mounting block is vertically adjustable on the post portion of the hitch bracket.

16 Claims, 5 Drawing Sheets

(56) References Cited

U.S. PATENT DOCUMENTS

| | | | | |
|---|---|---|---|---|
| 6,460,870 B2* | 10/2002 | Moss | ............... | B60D 1/06 |
| | | | | 280/491.3 |
| 6,715,781 B1 | 4/2004 | Smith | ............... | B60D 1/06 |
| 6,783,144 B2 | 8/2004 | McCoy et al. | ............. | B60D 1/06 |
| 6,883,822 B1 | 4/2005 | Smith | ............... | B60D 1/06 |
| 6,908,099 B2 | 6/2005 | Andersen | ............. | B60D 1/06 |
| 6,983,950 B2 | 1/2006 | McCoy et al. | ............. | B60D 1/06 |
| 7,125,036 B2 | 10/2006 | Moss et al. | ............. | B60D 1/06 |
| 7,156,412 B2 | 1/2007 | Andersen | ............. | B60D 1/52 |
| 7,222,510 B2 | 5/2007 | Andersen | ............. | B21C 23/00 |
| 7,963,545 B2 | 6/2011 | Coy | ............. | B60D 1/06 |
| 8,011,685 B2 | 9/2011 | Belinky et al. | ......... | B60D 1/06 |
| 8,033,563 B2* | 10/2011 | Good | ............. | B60D 1/065 |
| | | | | 280/416.1 |
| 8,366,133 B2 | 2/2013 | Brinkley | ............. | B60D 1/07 |
| 8,979,112 B2* | 3/2015 | Weipert | ............. | B60D 1/07 |
| | | | | 280/490.1 |
| 9,283,821 B2* | 3/2016 | Woolf | ............. | B60D 1/06 |
| 9,381,782 B2* | 7/2016 | Schwennsen | ........... | B60D 1/52 |
| 2001/0030410 A1 | 10/2001 | McCoige et al. | ....... | B60D 1/06 |
| 2003/0006581 A1* | 1/2003 | Moss | ............. | B60D 1/06 |
| | | | | 280/416.1 |
| 2004/0100066 A1* | 5/2004 | Andersen | ............. | B21C 23/14 |
| | | | | 280/511 |
| 2010/0127479 A1* | 5/2010 | Weipert | ............. | B60D 1/07 |
| | | | | 280/491.1 |
| 2012/0217724 A1* | 8/2012 | Works | ............. | B60D 1/06 |
| | | | | 280/490.1 |
| 2013/0127137 A1 | 5/2013 | McCoy et al. | ............. | B60D 1/06 |
| 2015/0266348 A1* | 9/2015 | Hauler | ............. | B60D 1/56 |
| | | | | 280/505 |

* cited by examiner

ADJUSTABLE HITCH ASSEMBLY

CROSS-REFERENCE TO PROVISIONAL APPLICATION(S)

This application claims the benefit of U.S. Provisional Application No. 62/484,117, filed Apr. 11, 2017. The foregoing patent disclosure is incorporated herein by this reference thereto.

BACKGROUND AND SUMMARY OF THE INVENTION

The invention relates to land vehicles and, more particularly, ball and socket type hitch apparatus.

A number of additional features and objects will be apparent in connection with the following discussion of the preferred embodiments and examples with reference to the drawings.

BRIEF DESCRIPTION OF THE DRAWINGS

There are shown in the drawings certain exemplary embodiments of the invention as presently preferred. It should be understood that the invention is not limited to the embodiments disclosed as examples, and is capable of variation within the scope of the skills of a person having ordinary skill in the art to which the invention pertains. In the drawings.

DETAILED DESCRIPTION OF THE PREFERRED EMBODIMENTS

Figure 1:
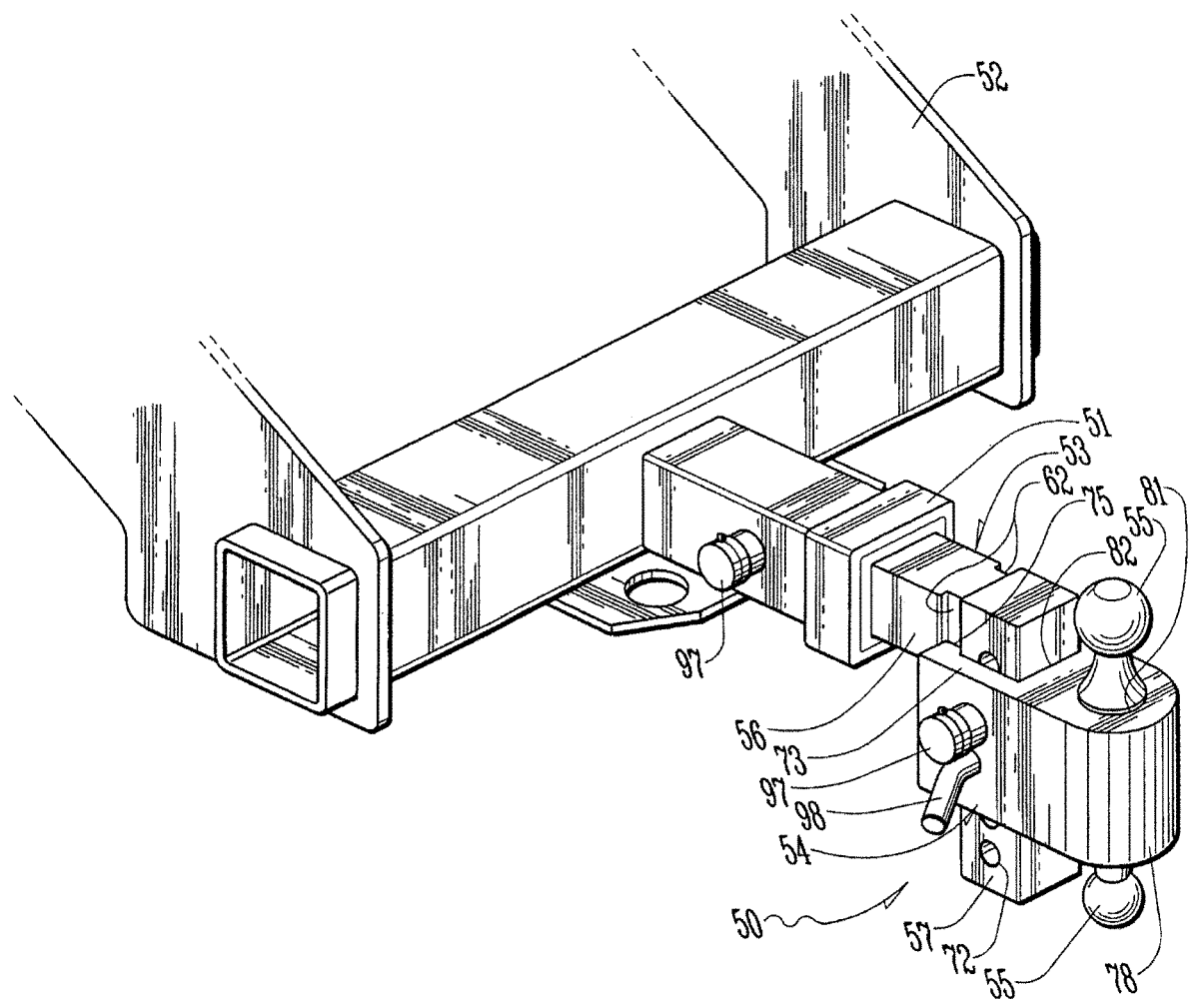
FIG. 1 is a perspective view of an adjustable hitch assembly in accordance with the invention, shown pinned to a receiver tube of a tow vehicle.
Figure 2:
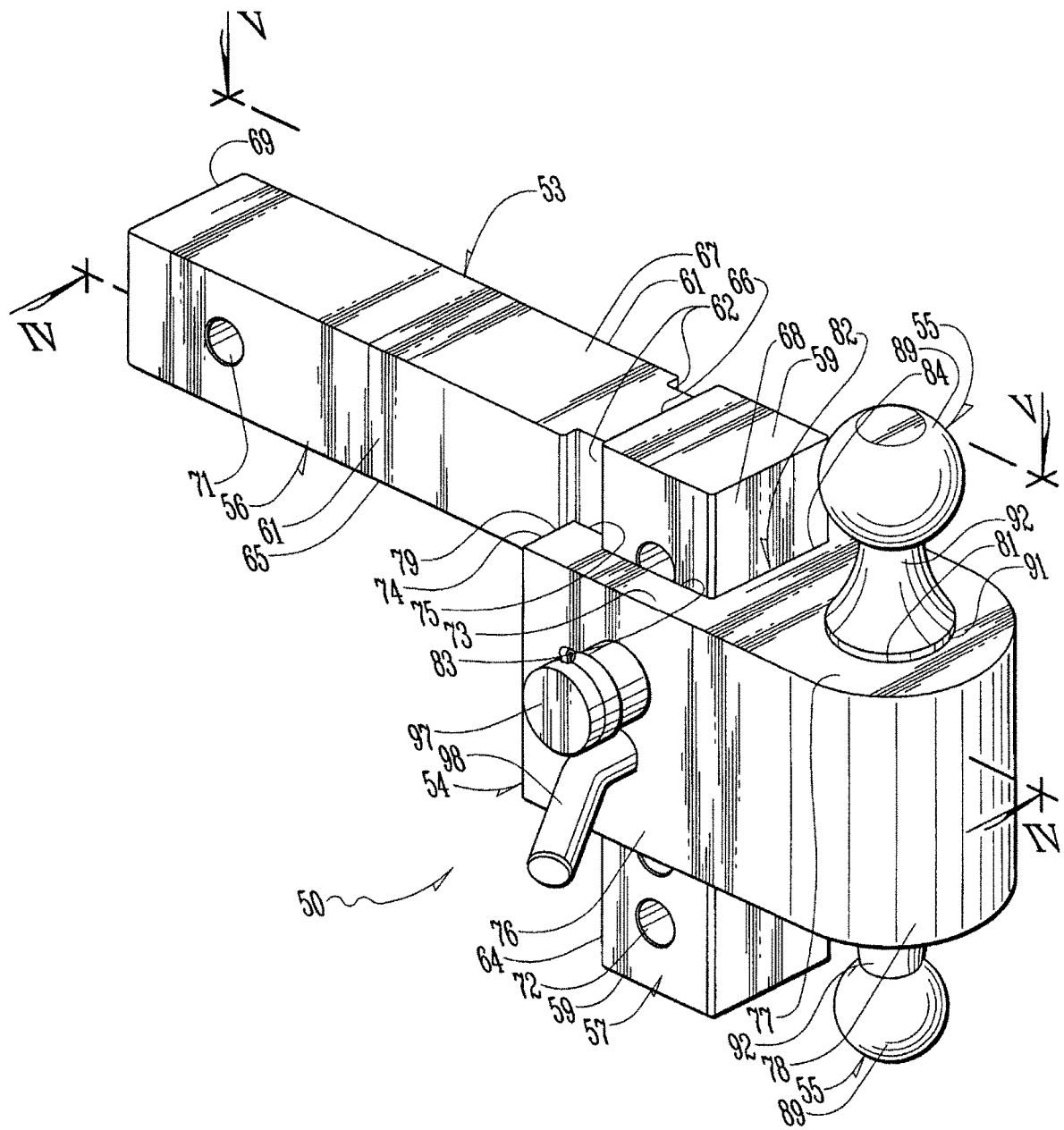
FIG. 2 is an enlarged-scale perspective view of the adjustable hitch assembly of FIG. 1 in isolation.

The FIGURES show an adjustable hitch assembly 50 in accordance with the invention for insertion in part in a receiver tube 51 of a tow vehicle 52 and coupling in other part with the coupler of a trailer or the like (coupler and trailer are not shown).

The adjustable hitch assembly 50 comprises a hitch bracket 53, a vertically-adjustable hitch-ball mounting block 54, one or more hitch balls 55, and assorted other hardware.

The hitch bracket 53 has essentially an L-shape and comprises a drawbar portion 56, a tenon portion 57 and a wedge-shaped, gusset-form enlargement 58 filling in the inside angle between the drawbar portion 56 and tenon portion 57. The hitch bracket 53 is preferably produced as a monolithic aluminum extrusion that is extruded out as an endless L-shaped bar, which is then sliced into individual units of the L-shaped bracket 53 that is shown in the FIGURES. The preferred aluminum alloy is a 6061 T6 aluminum-molybdenum alloy.

A non-limiting example for a hitch bracket 53 for a two inch (~5 cm) square-opening receiver tube 51 might have the following preferred (but without limitation) measurements. Both the drawbar portion 56 and tenon portion 57 (minus the wedge-shaped, gusset-form enlargement 58) would be two inches (~5 cm) square in cross-section. The height of the tenon portion 57 between spaced end walls 59 would be nine inches (~23 cm). The hitch bracket 53 overall has spaced opposite lateral sidewalls 61, which again, are generally two inches apart, except for a pair of opposite shallow channels 62 recessed into the lateral sidewalls 61 as more particularly described below.

Figure 4:
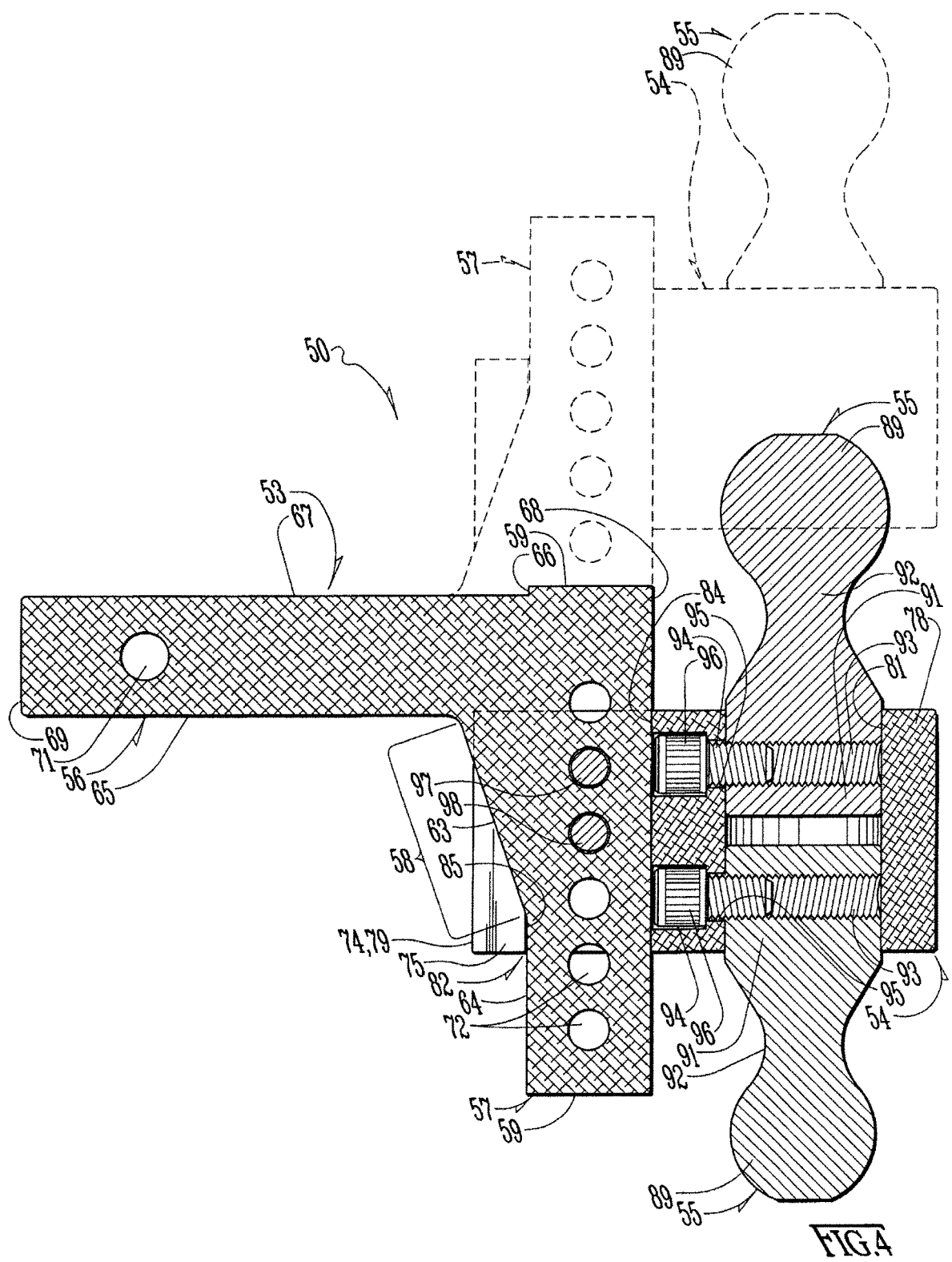
FIG. 4 is a partial sectional view taken along line IV-IV in FIG. 2, wherein the pair of cap screws are shown in solid line even though their central axes lie in the cutting plane, and the distal flange of the vertically-adjustable hitch-mount block is also shown in solid line but it lies behind the cutting plane.

The wedge-shaped, gusset-form enlargement 58 has an inside sidewall 63, which transitions into the inside sidewalls 64 and 65 respectively of the tenon portion 57 and drawbar portion 56. The wedge-shaped, gusset-formed enlargement 58 flares out from the tenon portion 57 at about twenty degree (20°) from the plane of the inside sidewall 64 of the tenon portion 57 (eg., about 20° from vertical in normal orientation). The footprint of the wedge-shaped, gusset-formed enlargement 58 on the inside sidewall 64 of the tenon portion 57 is preferably one-third to two-thirds of the height of the tenon portion 57. FIG. 4 shows a footprint corresponding to approximately four and three-fourths inches (~12 cm). Correspondingly, the length of the inside sidewall 64 of the tenon portion 57 (before it transitions into the inside sidewall 63 of the wedge-shaped, gusset-formed enlargement 58) is the remainder of the overall height of the tenon portion 57, minus a small fillet smoothing out a small step 66 between the outer sidewall 67 of the drawbar portion 56 and the end wall 59 of the tenon portion 57 closest to the outer sidewall 67 of the drawbar portion 56.

The tenon portion 57 has, opposite its inside sidewall 64, a rear wall 68. The drawbar portion 56 not only has, opposite its inside sidewall 65, the outer sidewall 67 mentioned above. The drawbar portion 56 also has a front wall 69. The axial length through the drawbar portion 56 between the front wall 69 of the drawbar portion 56 and the rear wall 68 of the tenon portion 57 is for example and without limitation eight inches 20 cm).

The drawbar portion 56 includes a hitch pin hole 71 through the lateral sidewalls 61 drawbar portion 56 of the hitch bracket 53. The hitch pin hole 71 is nominally five-eights of an inch (~16 mm) inside diameter. The tenon portion 57 is bored through the lateral sidewalls 61 of the tenon portion 57 of the hitch bracket 53 with a series of vertically-spaced block-securing pin holes 72. These holes 72 likewise have the same nominal inside diameter of hitch pin hole 71 (for convenience sake for sharing pins 97 and 98 among all holes 71 and 72) and are spaced apart between centers somewhere at about approximately one and one fourth inches (~3 cm).

The hitch bracket 53 can be flipped such that the tenon portion 57 is upright, rather only suspended as shown in the FIGURES. The above measurements purportedly give this adjustable hitch assembly 50 a drop to rise capability as follows:— six inch drop (~15 cm), and
a six and three-fourths inch rise (~17 cm).

Other proportions are preferred for other designs, including any of an eight inch drop (~20 cm) or 10 inch drop (25.4 cm), or else two and one-half inch square (6.35 cm) drawbar portion 56 and tenon portion 57, and so on.

Figure 5:
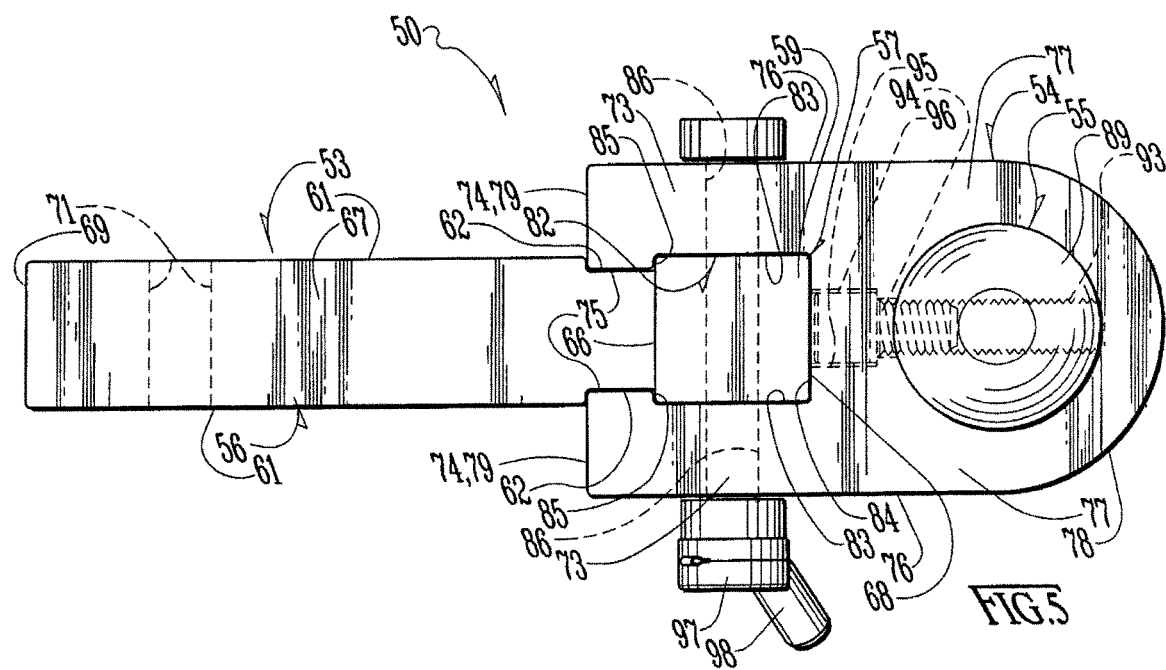
FIG. 5 is a top plan view taken in the direction of arrows V-V in FIG. 2.

To turn attention to the vertically-adjustable hitch-ball mounting block 54, FIG. 5 shows better that in a plan view of the block 54 it has an overall C-shape, wherein the more specific portions of the block 54 comprise a D-shaped web portion (facing the reverse direction of the overall C-shape) and spaced opposite parallel arms 73. The arms 73 have terminal ends 74 provided with opposite stub, terminal flanges 75 that come back toward each other. Thus the block 54 has spaced lateral sidewalls 76 and spaced end walls 77. The D-shaped web portion has a semi-cylindrical rear wall 78. The terminal flanges 75 present a pair of strip-like front walls 79 for the block 54.

Preferably the vertically-adjustable hitch-ball mounting block 54 is produced as a monolithic aluminum extrusion that is extruded out as an endless C-shaped bar, which is then sliced into individual units of a C-shaped block 54 as shown by the FIGURES. The preferred aluminum alloy is a 6061 T6 aluminum-molybdenum alloy.

The D-shaped web portion is formed with a two inch inside diameter through hole 81 (~5 cm) (more or less, given the normal orientation of the hitch bracket 53). This through hole 81 is a product of extrusion in part, and then machining in second part to provide a close tolerance. The diameter of the through hole 81 is determined by the mounting requirements of the hitch balls 55, as more particularly described below.

The web portion, arms 73 and terminal flanges 75 for the block 54 cooperatively define a slotted mortise hole 82 oriented on a vertical axis (more or less, given the normal orientation of the hitch bracket 53). This mortise hole 82 is likewise a product of extrusion in part, and then machining in second part to provide a close tolerance. The mortise hole 82 is defined between spaced sidewalls 83, and also between a spaced rear wall 84 and front wall 85. The front wall 85 is nearly non-existent and comprises two thin strips behind the lateral flanges 75. Hence the lateral flanges 75 define the slot that lend to the description of the mortise hole 82 as a slotted mortise hole 82. The slotted mortise hole 82 receives the tenon portion 57 of the hitch bracket 53 and can slide vertically up and down on the tenon portion 57. The arms 73 of the block 54 are formed with a pair of counterpart, vertically-spaced block-securing pin holes 86, on the same spacing between centers as any two adjacent block-securing pin holes 72 on the tenon portion 57 of the hitch bracket 53. Thus with the hitch bracket 53 oriented with the tenon portion 57 suspended, the block 54 can be secured by pins 97 and/or 98 between high and low extremes which are five inches (roughly 12 cm) apart.

Pause can be taken to turn attention to the hitch balls 55, before returning to the bore hole 81 in the mounting block 54 therefor.

The hitch balls 55 are not extruded aluminum pieces but are monolithic pieces of steel (albeit maybe finished or plated like with a chrome-plate finish or otherwise). The hitch balls 55 are preferably machined on lathes from cylindrical bar stock. Each hitch ball 55 comprises a ball head 89, a cylindrical shank base 91, and an neck 92 spanning between the ball head 89 and cylindrical shank base 91. The neck 92 tapers in smoothly on a curve from the transition from the cylindrical shank base 91 to a narrowest diameter just below the ball head 89.

The cylindrical shank base 91 is bored all the way through with a through hole 93 perpendicular to the vertical axis of the hitch ball 55, and directly through that vertical axis. This through hole 93 is threaded with internal thread for receiving cap screws 94, described next.

One cap screw 94 apiece secures each hitch ball 55 mounted to the mounting block 54 for the hitch balls 55. As the FIGURES show, the mounting block 54 can securely hold two hitch balls 55 at once. The cylindrical shank bases 91 of the hitch balls 55 insert into the through hole 81 through the D-shaped web portion of the mounting block 54. The two hitch balls 55 would be mounted on a common axis, but pointing in opposite directions from each other. In normal orientation, one hitch ball 55 would be ball-head 89 up and the other hitch ball 55 would be ball-head 89 down.

The rear wall 84 of the slotted mortise hole 82 in the mounting block 54 is bored through with a vertically-spaced pair of countersink holes 95. As FIG. 4 shows better, the countersink holes 95 would align with the respective threaded through holes 93 of each of the two hitch balls 55. The cap screws 94 preferably comprise something on the order of a Grade 8 cap screw (including metric equivalents, like for example and without limitation a ZT Class 12.8 steel alloy cap screw). Bolts of these Grades (or Classes) typically have properties on the order of 150,000 psi tensile strength (130,000 psi yield strength). Although not shown in the drawings, the cap screws 94 have internal hexagon drive recesses (or other like internal drive recesses) formed in their heads 96 for tightening and backing out and so on.

Figure 3:
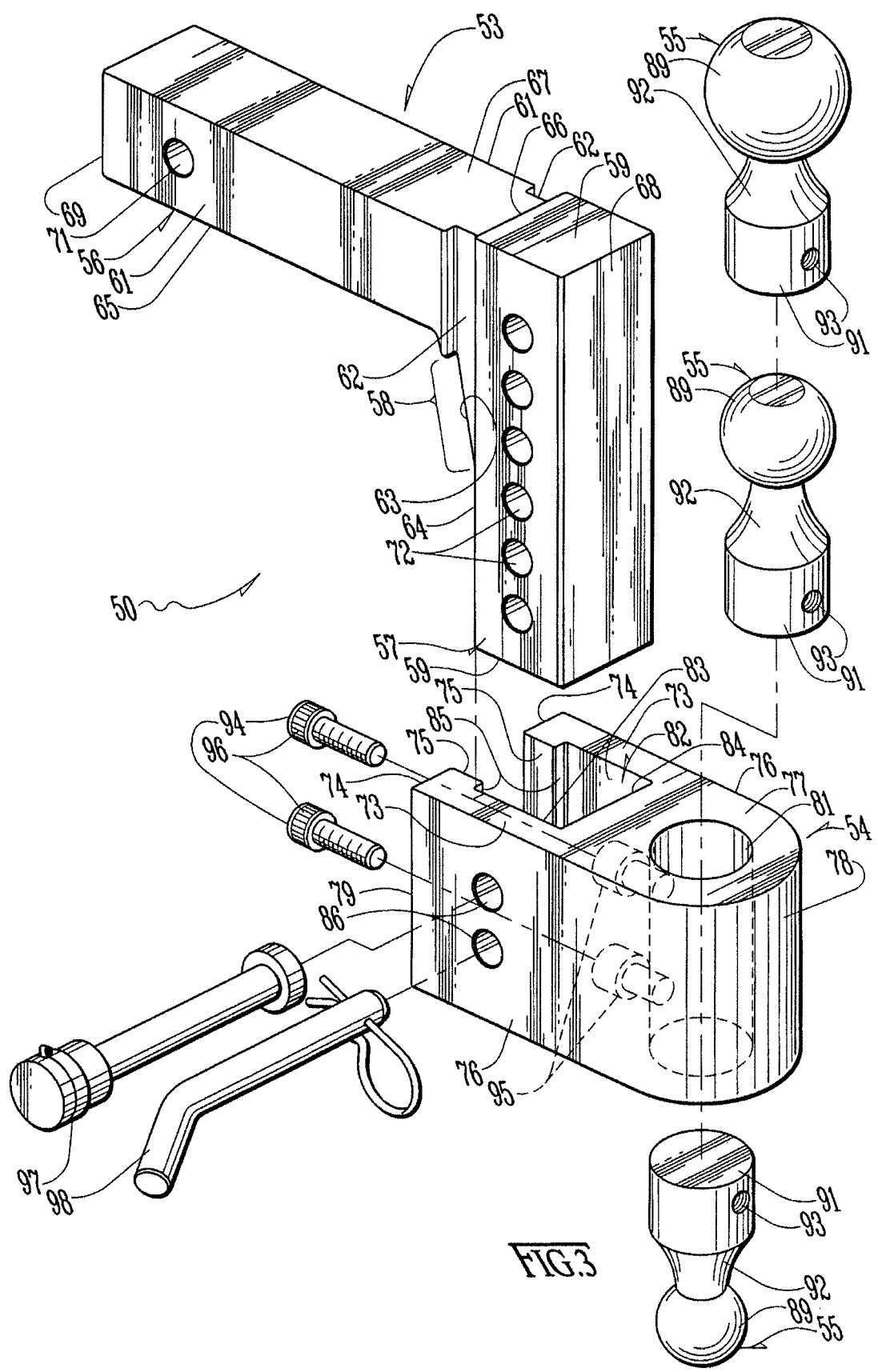
FIG. 3 is an exploded perspective view of FIG. 2, and showing a third hitch ball as a replaceable option for the other two hitch balls previously shown (and shown again in this view)

To mount or remove the hitch balls 55 to and from the mounting block 54, the mounting block 54 has to be slid off the tenon portion 57 of the hitch bracket 53, as shown in FIG. 3. The mounting block 54 can be slid off the tenon portion 57 of the hitch bracket 53 in either direction, up or down. As FIG. 3 shows better, the hitch bracket 53 is formed (machined) with a pair of opposite shallow channels 62 that are recessed across the lateral sidewalls 61 of both (1) the drawbar portion 56 and (2) the wedge-shaped, gusset-form enlargement 58 of the hitch bracket 53. These opposite channels 62 just skirt the plane of the inside sidewall 64 of the tenon portion 57 of the hitch bracket 53. While shallow, these opposite channels 62 are just deep enough and wide enough to provide free sliding clearance of the terminal flanges 75 of the arms 73 of the mounting block 54. Hence neither the drawbar portion 56 nor the wedge-shaped, gusset-form enlargement 58 of the hitch bracket 53 impede the passage of the terminal flanges 75.

That way, the mounting block 54 can be slid on or off the tenon portion 57 of the bracket 53 in either direction, up or down.

FIG. 1 shows that drawbar portion 56 of the hitch bracket 53 is pinned to the receiver tube 51 by one locking pin 97, and that the mounting block 54 is pinned to the tenon portion 57 of the hitch bracket 53 by two pins 97 and 98, but only one of which is a locking pin 97. All the pins 97 and 98 are interchangeable, but given the arrangement of locking pins 97 in FIG. 1, the adjustable hitch assembly 50 in accordance with the invention is fairly theft proof.

The hitch balls 55 are furthermore distinguished by having long necks 92 with taper in on large radiuses.

For example, for a nominal one and seven-eighths inch diameter hitch ball (~4¾ cm), the neck 92 tapers in from cylindrical shank base 91 on a nominal forty to forty-five mm radius (40 to 45 mm).

For a nominal two inch (~5 cm) diameter hitch ball 55, the neck 92 tapers in from cylindrical shank base 91 again on a nominal forty to forty-five mm radius (40 to 45 mm).

For a nominal two and five-sixteenths inch (~5⅞ cm) diameter hitch ball 55, the neck 92 one more time tapers in from cylindrical shank base 91 on a nominal forty to forty-five mm radius (40 to 45 mm).

The Society of Automotive Engineers has a standard for rating tow hitches, which SAE J684. The adjustable hitch assembly 50 in accordance with the invention was tested with the largest hitch ball 55 and both with the lowest drop and highest rise. The adjustable hitch assembly 50 in accordance with the invention has to pull 36,000 pounds (~46,500 kg) and not deflect more than one degree (1°). The adjustable hitch assembly 50 in accordance with the invention passed by deflecting just only about four-tenths of a degree (0.4°).

Furthermore, the adjustable hitch assembly 50 in accordance with the invention had to withstand a vertical applied load on the ball head 89 of 18,000 pounds (~8,200 kg). Again, the adjustable hitch assembly 50 in accordance with the invention passed that test too by deflecting just only about four-tenths of a degree (0.4°).

The invention having been disclosed in connection with the foregoing variations and examples, additional variations will now be apparent to persons skilled in the art. The invention is not intended to be limited to the variations specifically mentioned, and accordingly reference should be made to the appended claims rather than the foregoing discussion of preferred examples, to assess the scope of the invention in which exclusive rights are claimed.

I claim:

1. An adjustable hitch assembly, comprising:
a hitch bracket;
a vertically-adjustable hitch-ball mounting block;
a plurality of hitch pins;
one or more hitch balls; and
wherein the hitch bracket is generally L-shaped and comprises a generally horizontal drawbar portion having a rectilinear cross-section as well as a generally-vertical tenon portion having a rectilinear cross-section;
wherein the vertically-adjustable hitch-ball mounting block comprises a web, arms extending out of the web, and in-turned flanges on the arms spaced away from the web which collectively define a slotted mortise hole aligned generally on a vertical axis and having a generally rectilinear cross-section for receiving the tenon portion for sliding elevational adjustability thereon;
wherein the vertically-adjustable hitch-ball mounting block is vertically adjustable on the post portion of the hitch bracket; and
wherein the web of the vertically-adjustable hitch-ball mounting block defines a rear wall for the slotted mortise hole and is formed with a generally vertical through hole;
the hitch ball comprises a cylindrical shank base that transitions into a neck which in turn transitions into a ball head;
said cylindrical shank base of the hitch ball is received in the through hole in the web of the vertically-adjustable hitch-ball mounting block;
said rear wall for slotted mortise hole of the vertically-adjustable hitch-ball mounting block is formed with a pin-receiving hole into the through hole and adapted for a pin to secure the hitch ball.

2. The adjustable hitch assembly of claim 1, wherein:
at least one hitch pin is adapted to pin the drawbar portion fixed in a receiver tube of a tow vehicle and at least one other hitch pin is adapted to pin the vertically-adjustable hitch-ball mounting block at a chosen height on the tenon portion.

3. The adjustable hitch assembly of claim 1, wherein:
the plurality of hitch pins comprise three hitch pins, at least two which are locking hitch pins;

wherein at least one hitch pin is adapted to pin the drawbar portion fixed in a receiver tube of a tow vehicle; and
wherein the two other hitch pins are adapted to pin the vertically-adjustable hitch-ball mounting block at a chosen height on the tenon portion.

4. The adjustable hitch assembly of claim 1, wherein:
the cylindrical shank base of the hitch ball is formed with a counterpart pin-receiving hole.

5. The adjustable hitch assembly of claim 4, further comprising:
a threaded fastener;
wherein the counterpart pin-receiving hole in the cylindrical shank base of the hitch ball is formed with internal thread;
whereby the pin-receiving hole in the rear wall for the slotted mortise hole of the vertically-adjustable hitch-ball mounting block is adapted to receive the threaded fastener for threading into the internal thread of the counterpart pin-receiving hole in the cylindrical shank base of the hitch ball.

6. The adjustable hitch assembly of claim 5, wherein:
the threaded fastener comprises a head and shank, portions of which at least are formed with external thread; and
wherein the pin-receiving hole in the rear wall for the slotted mortise hole of the vertically-adjustable hitch-ball mounting block is provided with a countersunk recess sized and proportioned to allow the head of the threaded fastener to retreat rear of the plane of the rear wall for the slotted mortise hole of the vertically-adjustable hitch-ball mounting block when tightened;
whereby the head of the threaded fastener will not impede the vertical adjustability of the vertically-adjustable hitch-ball mounting block on the tenon portion.

7. The adjustable hitch assembly of claim 6, wherein:
at least one hitch pin is adapted to pin the drawbar portion fixed in a receiver tube of a tow vehicle and at least one other hitch pin is adapted to pin the vertically-adjustable hitch-ball mounting block at a chosen height on the tenon portion.

8. The adjustable hitch assembly of claim 7, wherein:
the tenon portion is formed with a series of generally-vertically spaced hitch-pin receiving holes and the arms of the slotted mortise hole of the vertically-adjustable hitch-ball mounting block are formed with at least one hitch-pin receiving hole.

9. An adjustable hitch assembly, comprising:
a hitch bracket;
a vertically-adjustable hitch-ball mounting block;
a plurality of hitch pins;
one or more hitch balls; and
wherein the hitch bracket is generally L-shaped and comprises a generally horizontal drawbar portion having a rectilinear cross-section as well as a generally-vertical tenon portion having a rectilinear cross-section;
wherein the vertically-adjustable hitch-ball mounting block comprises a web, arms extending out of the web, and in-turned flanges on the arms spaced away from the web which collectively define a slotted mortise hole aligned generally on a vertical axis and having a generally rectilinear cross-section for receiving the tenon portion for sliding elevational adjustability thereon;

wherein the vertically-adjustable hitch-ball mounting block is vertically adjustable on the post portion of the hitch bracket; and wherein the adjustable hitch assembly further comprises two hitch balls balls;

wherein the web of the vertically-adjustable hitch-ball mounting block defines a rear wall for the slotted mortise hole and is formed with a generally vertical through hole;

each hitch ball comprises a cylindrical shank base that transitions into a neck which in turn transitions into a ball head;

said cylindrical shank bases of the two hitch ball are received in the through hole in the web of the vertically-adjustable hitch-ball mounting block, one head-down and the other head-up;

said rear wall for slotted mortise hole of the vertically-adjustable hitch-ball mounting block is formed with a pair of generally-vertically spaced pin-receiving holes into the through hole and adapted for a pair of pins to secure each hitch ball.

10. The adjustable hitch assembly of claim 9, wherein:
the cylindrical shank base of each hitch ball is formed with a counterpart pin-receiving hole.

11. The adjustable hitch assembly of claim 10, further comprising:
a pair of threaded fasteners;
wherein the counterpart pin-receiving holes in the cylindrical shank base of the hitch balls are formed with internal thread;
whereby the pin-receiving holes in the rear wall for the slotted mortise hole of the vertically-adjustable hitch-ball mounting block are adapted to receive one apiece of the threaded fasteners for threading into the internal thread of the counterpart pin-receiving holes in the cylindrical shank bases of the hitch balls.

12. The adjustable hitch assembly of claim 11, wherein:
each threaded fastener comprises a head and shank, portions of which at least are formed with external thread; and wherein each pin-receiving hole in the rear wall for the slotted mortise hole of the vertically-adjustable hitch-ball mounting block are provided with a countersunk recess sized and proportioned to allow the heads of the threaded fasteners to retreat rear of the plane of the rear wall for the slotted mortise hole of the vertically-adjustable hitch-ball mounting block when tightened;

whereby the heads of the threaded fasteners will not impede the vertical adjustability of the vertically-adjustable hitch-ball mounting block on the tenon portion.

13. The adjustable hitch assembly of claim 12, wherein:
at least one hitch pin is adapted to pin the drawbar portion fixed in a receiver tube of a tow vehicle and at least one other hitch pin is adapted to pin the vertically-adjustable hitch-ball mounting block at a chosen height on the tenon portion.

14. The adjustable hitch assembly of claim 13, wherein:
the tenon portion is formed with a series of generally-vertically spaced hitch-pin receiving holes and the arms of the slotted mortise hole of the vertically-adjustable hitch-ball mounting block are formed with at least one hitch-pin receiving hole.

15. The adjustable hitch assembly of claim 14, wherein:
wherein the hitch bracket has essentially an L-shape; and
the hitch bracket is produced from slices of L-shaped extruded aluminum stock.

16. The adjustable hitch assembly of claim 9, wherein:
at least one hitch pin is adapted to pin the drawbar portion fixed in a receiver tube of a tow vehicle and at least one other hitch pin is adapted to pin the vertically-adjustable hitch-ball mounting block at a chosen height on the tenon portion; and the tenon portion is formed with a series of generally-vertically spaced hitch-pin receiving holes and the arms of the slotted mortise hole of the vertically-adjustable hitch-ball mounting block are formed with at least one hitch-pin receiving hole.

\* \* \* \* \*

US010857846C1

(12) EX PARTE REEXAMINATION CERTIFICATE (12675th)
United States Patent
Jacobs

(10) Number: US 10,857,846 C1
(45) Certificate Issued: Aug. 12, 2024

(54) ADJUSTABLE HITCH ASSEMBLY

(71) Applicant: Donald W. Jacobs, Springfield, MO (US)

(72) Inventor: Donald W. Jacobs, Springfield, MO (US)

(73) Assignee: URIAH PRODUCTS, LLC

Reexamination Request:
No. 90/019,492, Apr. 22, 2024

Reexamination Certificate for:
Patent No.: 10,857,846
Issued: Dec. 8, 2020
Appl. No.: 15/950,586
Filed: Apr. 11, 2018

Related U.S. Application Data

(60) Provisional application No. 62/484,117, filed on Apr. 11, 2017.

(51) Int. Cl.
*B60D 1/46* (2006.01)
*B60D 1/06* (2006.01)
*B60D 1/52* (2006.01)
*B60D 1/48* (2006.01)
*B60D 1/60* (2006.01)

(52) U.S. Cl.
CPC .............. *B60D 1/46* (2013.01); *B60D 1/06* (2013.01); *B60D 1/065* (2013.01); *B60D 1/52* (2013.01); *B60D 1/485* (2013.01); *B60D 1/60* (2013.01)

(58) Field of Classification Search
None
See application file for complete search history.

(56) References Cited

To view the complete listing of prior art documents cited during the proceeding for Reexamination Control Number 90/019,492, please refer to the USPTO's Patent Electronic System.

*Primary Examiner* — Patricia L Engle

(57) ABSTRACT

An adjustable hitch assembly has a hitch bracket, a vertically-adjustable hitch-ball mounting block, one or more hitch balls, and assorted other hardware including a plurality of hitch pins. The hitch bracket has essentially an L-shape and has a drawbar portion having an inside sidewall, a post portion having an inside sidewall and a wedge-shaped, gusset-form enlargement having an inside sidewall which transitions into the inside sidewalls respectively of the post portion and drawbar portion, filling in the inside angle between the drawbar portion and post portion. Wherein the vertically-adjustable hitch-ball mounting block is vertically adjustable on the post portion of the hitch bracket.

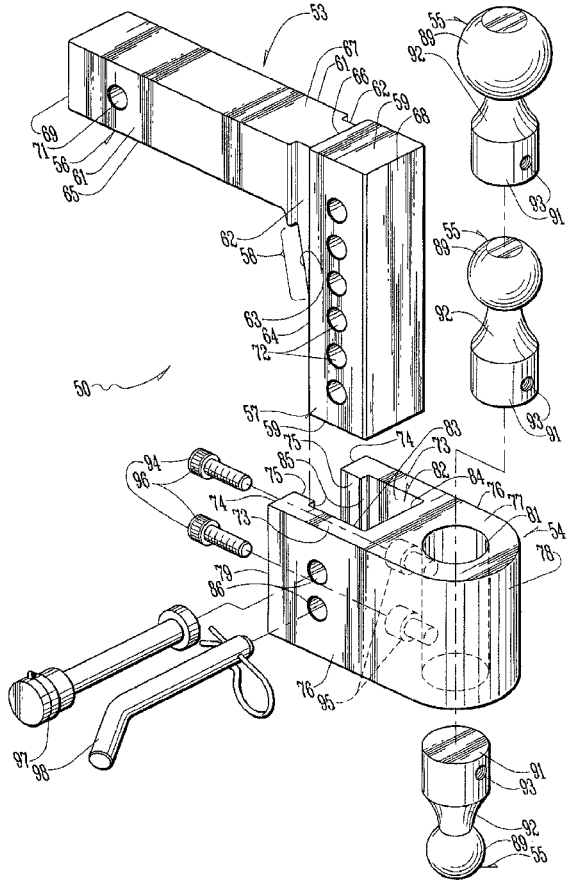

EX PARTE REEXAMINATION CERTIFICATE

NO AMENDMENTS HAVE BEEN MADE TO THE PATENT

AS A RESULT OF REEXAMINATION, IT HAS BEEN DETERMINED THAT:

The patentability of claims 1-16 is confirmed.

\* \* \* \* \*